United States Patent [19]

Kammerl

[11] Patent Number: 5,051,983
[45] Date of Patent: Sep. 24, 1991

[54] METHOD AND CIRCUITRY FOR TRANSMISSION OF SPEECH SIGNALS IN A BROAD-BAND COMMUNICATIONS NETWORK

[75] Inventor: Anton Kammerl, Groebenzell, Fed. Rep. of Germany

[73] Assignee: Siemens Aktiengesellschaft, Berlin and Munich, Fed. Rep. of Germany

[21] Appl. No.: 403,528

[22] Filed: Sep. 5, 1989

[30] Foreign Application Priority Data

Sep. 23, 1988 [EP] European Pat. Off. ............ 88115727

[51] Int. Cl.⁵ .............................................. H04Q 1/04
[52] U.S. Cl. .................................... 370/60; 370/94.1; H04Q/11/04
[58] Field of Search ................... 370/58.1, 58.2, 58.3, 370/60, 60.1, 94.1, 94.2, 94.3, 110.1

[56] References Cited

U.S. PATENT DOCUMENTS

| | | | |
|---|---|---|---|
| 4,556,972 | 12/1985 | Chan et al. | 370/60 |
| 4,782,485 | 11/1988 | Gollub | 370/60 |
| 4,862,451 | 8/1989 | Closs et al. | 370/60 |

OTHER PUBLICATIONS

"Broadband ISDN Switching Capabilities from a Services Perspective" by Dan R. Spears; IEEE Journal on Selected Areas in Communications, vol. SAC-5, No. 8, Oct. 1987, New York, NY; pp. 1222-1230.
"High Speed Packet Switching Network for Multi--Media Information" by S. Nojima, et al.; Computer Networking Symposium (IEEE, New York); Nov. 17-18, 1986, Washington, DC; pp. 141-150.
"Die Vermittlungstechnik in integrierten Paketuebermittlungssystemen (Teil 1)" von W. Schmidt; 41. Jahrang, Heft 9, Sep. 1987; pp. 1-9.

Primary Examiner—Douglas W. Olms
Assistant Examiner—Wellington Chin
Attorney, Agent, or Firm—Jeffrey P. Morris

[57] ABSTRACT

A broad-band communications network consists of at least one broad-band packet exchange for transmission of communications signals in packets of a fixed length and one telephone exchange connected to the broad-band packet exchange by means of at least one interworking unit. Packing/depacking units are provided at the interfaces of the packet exchange to the subscriber's sets and within the respective interworking units. A control signal is sent following trunking to the packing/depacking units involved in the connection to be established for connections with a network transfer. The control signal controls the packing/depacking units such that packets of a fixed length intended for transmission of speech signals are formed or broken up, in accordance with a adjusted degree of packet filling which is reduced in comparison with the full packet capacity.

6 Claims, 3 Drawing Sheets

METHOD AND CIRCUITRY FOR TRANSMISSION OF SPEECH SIGNALS IN A BROAD-BAND COMMUNICATIONS NETWORK

CROSS REFERENCE TO RELATED APPLICATION

Anton Kammerl, U.S. application Ser. No. 403,547 for Transmission of Communication Signals In A Broad-Band Communications Network.

BACKGROUND OF THE INVENTION

1. Field of the Invention

This invention relates to a method and a circuit for speech transmission in a broad-band communications network.

2. Description of the Prior Art

A broad-band communications network is known in the prior art (*Der Fernmelde-Ingenieur*, Volume 41, No. 9, Sept. 1987 ("Switching Technology in Packet Transmission Systems"), pages 2 to 8) wherein signals of different services are transmitted according to an ATD (asynchronous time division) process, i.e., in packets. Transmission of speech signals following dial connections between subscriber's sets is provided in this known system. The broad-band communications network has packing/depacking equipment to form packets and to dissolve them.

In broad-band communications networks in which packets of a fixed length are transmitted, lag times occur in transmission of speech signals due to the required packing/depacking times as well as the processing and waiting times in exchange systems and these lag times can have a negative effect on the quality of speech signal transmissions. For example, if the lag time is too long, it may result in undesirably long speech pauses which interfere with the flow of speech. In addition, connections to subscriber's sets can also take place by way of hybrid sets in broad-band communications networks which include analog/digital telephone switching network in addition to broad-band packet switching networks, and additional problems can occur in a transfer between these networks. Such problems arise from the fact that the transit time of echo signals caused by the hybrid sets can assume a size such that the echo signals are perceived as interference by the telephone subscribers due to the aforementioned lag times in the packet switching networks.

Such echo signals can be suppressed by echo suppressors or echo compensators connected into the transmission lines. However, this requires expensive circuitry which is undesirable in some cases. In addition, there have already been proposals for reducing the lag times in broad-band packet switching networks by filling packets of a fixed length only partially with speech signals in speech signal transmissions.

The problem which the present invention overcomes is reduce the lag times due to the packet switching network in transmission of speech signals at least partially in a packet switching network.

SUMMARY OF THE INVENTION

The aforementioned problem is overcome in a process according to the invention. The invention provides the advantage that with telephone connections running over the packet exchange network under the control of the network transfer equipment between the packet switching network and the analog/digital switching network without any control expense in packet switching systems, the degree of packet filling for packets of a fixed length is reduced in order to reduce the aforementioned lag times whereas the full packet capacity can be utilized for communications signals to be transmitted following connections of other services. Due to this reduction in the degree of packet filling use of the aforementioned echo suppression systems can be largely eliminated, or at least the need for them can be greatly reduced.

Only a slight additional control expense is needed in network transfer units and in the packing/depacking units connected to subscriber's sets when the control signal is sent directly from the respective network transfer unit to the respective packing/depacking unit assigned to it and when the control signal is inserted into a signaling packet to be transmitted following trunking (connection establishment), for transmission to the other packing/depacking unit participating in the connection to be established. Due to this insertion of control signals as additional information into signaling packets to be transmitted during trunking, no changes in existing signaling procedures are necessary.

In addition, it is expedient that the full capacity of the speech signal packets is utilized by the packing/depacking units in the basic setting for the transmission of speech signals and a control signal is sent from the network transfer unit to the packing/depacking units involved in the connection to be established for the purpose of reduction of the degree of packet filling of the speech signal packets, whereby this control signal is sent only in response to the occurrence of a request signal in the respective network transfer unit. In this way the full packet capacity for speech signal transmissions can be utilized for connections that run exclusively within the packet switching network whereas for connections with a network transfer the degree of packet filling is reduced.

If there is a multiplicity of network transfers in different transmission directions between a packet switching network and one or more telephone switching network, it is advantageous for the degree of packet filling for speech signal packets to be adjusted by the network transfer units individually by delivering a corresponding control signal, in accordance with the transmission direction. This provides the advantage that the best degree of packet filling of speech signal packets can be adjusted individually for certain groups of connections assigned to the network transfer units.

For a broad-band communications network in which a packet switching system is inserted as a transit switching system over network transfer units between two telephone exchanges, it is advantageous if a control signal is delivered only by the network transfer units (of the network transfer units included in a connection) that has received a request signal in the form of a call packet from the packet switching system. In this way only one network transfer unit is included in the control of the transmission of speech signal packets even for such a broad-band communications network, so except for transmission of a control signal to adjust the degree of packet filling no additional communications are necessary between the two network transfer units.

A further advantage of the invention is the minor additional expense in terms of circuitry required to adjust the degree of packet filling for speech signal packets in network transfer units and in the packing-/depacking units connected to subscriber's sets.

The present invention is illustrated in detail in the accompanying figures and described with reference to a preferred embodiment, wherein:

DESCRIPTION OF THE PREFERRED EMBODIMENT

Figure 1:
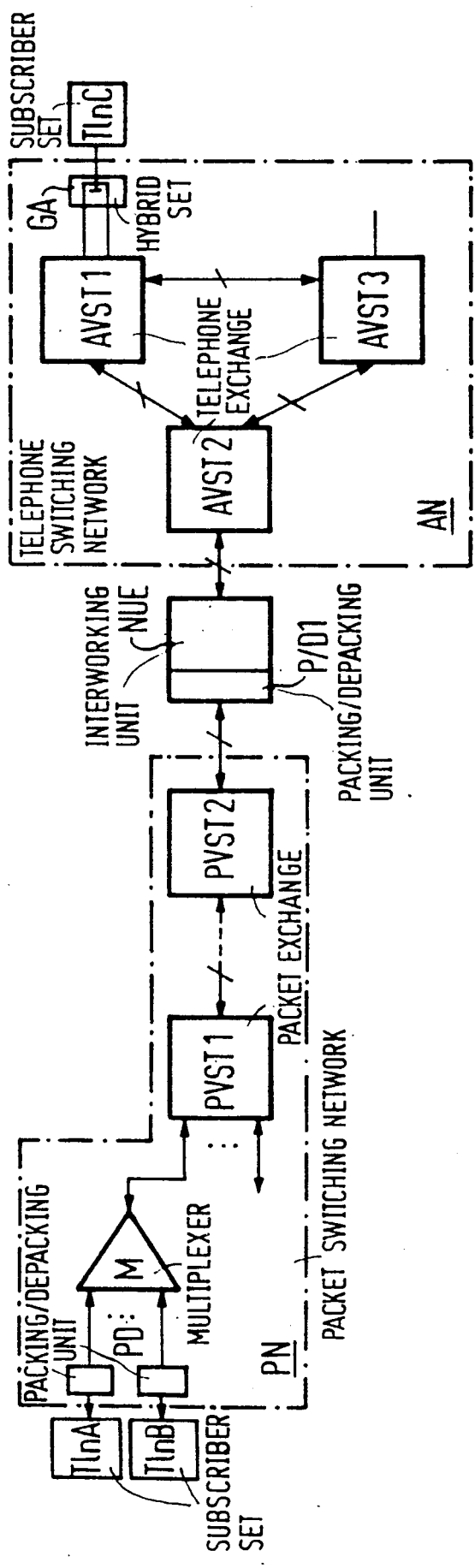
FIG. 1 shows schematically a first example of a broad-band communications network using the present invention.

The broad-band communications network illustrated in FIG. 1 may consist of a broad-band packet switching network PN and an analog or digital telephone switching network AN for connection of analog telephone subscriber's sets by a 4-wire/2-wire hybrid set. The packet switching network PN consists of one or more interconnected packet switching systems only two of which are illustrated (PVST1 and PVST2). Each of these packet switching systems has a number of connecting lines which may be used either as subscriber's lines or as interoffice trunks. To simplify FIG. 1, however, only two such subscriber connecting lines as well as one interoffice trunk for packet switching system PVST1 and 2 interoffice trunks for packet switching system PVST2 are shown.

Within the broad-band packet switching network signals of different services are transmitted in packets of a fixed length according to the ATM method (asynchronous transfer mode). The information field of each of the packets is set at 32 octets, for example. The transmission rate on the connecting lines is 140 Mbits/sec, for example. For establishing of dial connections, depending on whether the connecting lines are subscriber's lines or interoffice trunks, the signaling procedures that are used conform to the D channel protocol established in accordance with the ISDN recommendations (integrated services digital network). For interoffice trunks they may conform to the central channel signaling system No. 7. Packing/depacking units connected to subscriber's lines by multiplexers are provided at the interface between the packet switching network and the subscriber's sets which may be ISDN subscriber's sets, in order to insert the signals delivered by the subscriber's sets into packets of a fixed length or to break up packets transmitted by the packet switching network so the signals can be relayed onto the subscriber's sets. FIG. 1 shows a multiplexer M, two packing/depacking units P/D as well as two subscriber's sets TlnA and TlnB connected to the latter. It should be pointed out here that the packing/depacking units can also be part of the subscriber's sets.

For a network transfer between packet switching network PN and the above-mentioned telephone switching network AN, a network transfer unit NUE (interworking unit) is provided which is connected on the one hand to the telephone switching network by a trunk group with a number of individual lines and on the other hand is connected to the packet (switching network) by way of at least one interoffice trunk. This interworking unit performs all the signal and procedure conversions needed for network transfer. For this reason, a packing/depacking unit P/D1 is connected to the respective interoffice trunk. The telephone switching network AN itself may be a traditional telephone switching network which may consist, for example, of a number of telephone interconnected by interoffice trunks. These telephone exchanges, three of which are shown in FIG. 1 where they are labeled as AVST1, AVST2 and AVST2, each have subscriber's lines in addition to interoffice trunks, and analog subscriber's sets can be connected to these subscriber's lines by hybrid sets GA. FIG. 1 shows a hybrid set connected to the telephone exchange AVST1 and a subscriber's set Tlnc connected to the latter in a schematic diagram. In addition, according to FIG. 1 the telephone exchange AVST2 is connected to the aforementioned interworking unit NUE.

With reference to the broad-band communications network illustrated in FIG. 1 which has already been explained, the process according to the present invention will now be described in detail. It is assumed that a connection from the subscriber's set TlnA of packet switching network AN to subscriber's set TlnC of the telephone switching network AN is to be established for a speech signal transmission.

To initiate trunking, selection information is delivered in a known way by subscriber's set TlnA where this selection information designates the subscriber's set selected for the connection, namely in this case subscriber's set TlnC. This selection information is inserted with the help of the packing/depacking unit P/D connected to the subscriber's set TlnA into a so-called call packet and then is sent to the packet switching system PVST1 where a routing guidance is performed in a known way on the basis of the selection information. On the basis of this routing guidance, the call packet is sent to the packet switching system PVST2 where the routing guidance just performed leads to the result that the call packet previously received is transmitted to the interworking unit NUE, where the call packet is broken up with the help of the packing/depacking unit (e.g., P/D1) connected to the respective transmission line and after a signal and procedure conversion, the selection information thus received is sent on to the telephone switching network AN, namely in this case to the telephone exchange AVST2, and from there the connection to the subscriber's set TlnC can be established.

In response to reception of the aforementioned call packet the interworking unit NUE also produces a control signal in order to adjust the packing/depacking units P/D1 and P/D participating in the connection to be established in such a way that when they fill the speech signal packets to be transmitted over the packet switching network PN after trunking, so the packets are filled only up to a reduced degree of packet filling in comparison with the full packet capacity or they break up the signal packets to be transmitted in accordance with the reduced degree of packet filling. The degree of packet filling can be set, for example, at half the full packet capacity.

The aforementioned control signal is sent from the interworking unit NUE to its respective packing-/depacking unit P/D1 directly to establish a new setting. In addition, this control signal is also sent to the packing/depacking unit P/D connected to the subscriber's set TlnA by way of the packet switching network PN. This control signal can be inserted into a packet which is to be transmitted in the direction of subscriber's set TlnA following trunking in accordance with the signaling procedure provided. Then on receiving the control signal an adjustment is performed in the latter packing/depacking unit such that the packets are filled with speech signals or they are broken up in accordance with the reduced degree of packet filling after trunking.

With a desired trunk connection from subscriber's set TlnC to subscriber's set TlnA in principle the process steps that take place conform to those just described. In this case the selection information sent from subscriber's set TlnC over interworking unit NUE is converted to a call packet and sent on to packet exchange PVST2. In this connection direction the interworking unit again produces a control signal in order to set the packing/depacking units involved in the connection with regard to the degree of packet filling for speech signals to be set.

The packing/depacking units P/D connected to the subscriber's sets and the packing/depacking units P/D1 belonging to the interworking unit NUE are normally set in their basic setting, so they either completely fill speech signal packets with speech signals or they completely break them up in this basic setting. Only on the occurrence of a control signal is the degree of packet filling for speech signal packets then reduced. In this way it is possible for the degree of packet filling for speech signal packets to be reduced only for connections involving a network transfer whereas for connections running exclusively within the packet switching network, the full capacity for speech signal packets can be utilized.

Figure 2:
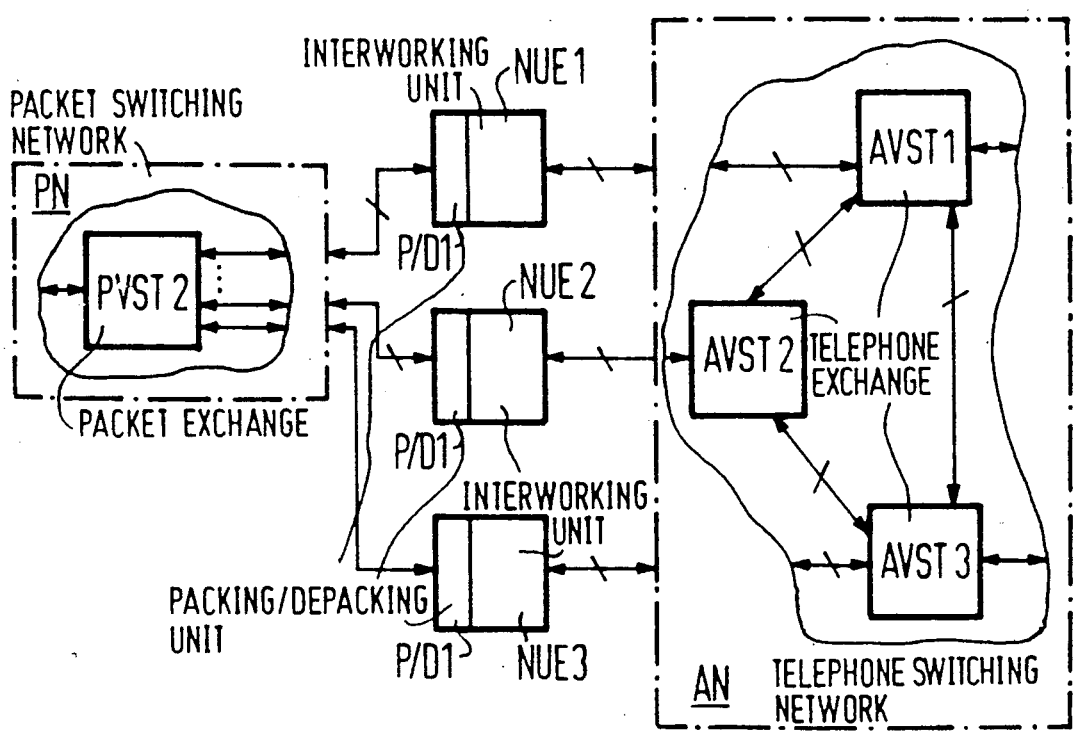
FIG. 2 shows a second example of a broad-band communications network using the present invention.

FIG. 2 shows details of a broad-band communications network that is modified in comparison with that shown in FIG. 1 such that a number of network transfer are provided in different transmission directions. As an example, three interworking units NUE1, NUE2 and NUE3 are connected to the packet switching network PN and the telephone switching network AN. The three network transfer units are each connected to three different telephone exchanges AVST1, AVST2 and AVST3 by way of a trunk group for each. In this broadband communications network process steps take place that conform to the process steps described above for establishing the degree of packet filling of speech signal packets. The modes of operation of the interworking units are designed such that the degree of packet filling for speech signal packets is adjusted individually by them as a function of the transmission direction by delivering a corresponding control signal. The degrees of packing filling may differ from each other in order to be able to individually set the best degree of packet filling of speech signal packets for certain trunk groups assigned to the interworking units. In this way, the degree of packet filling can be adapted to trunk connections that differ in length.

Moreover, the broad-band communications networks diagrammed in FIGS. 1 and 2 can also be modified such that the packet switching network PN is connected as a transit network by way of interworking units between two telephone switching network. In this case the operation of the interworking units is designed so that of the interworking units included in a connection, only that which receives a call packet from the packet switching network PN will deliver a control signal for adjusting the packing/depacking units. This assures that only one interworking unit is included in the control of the transmission of speech signal packets, so except for the transmission of a control signal for setting the degree of packet filling, no additional communications are necessary between the interworking units.

Figure 3:
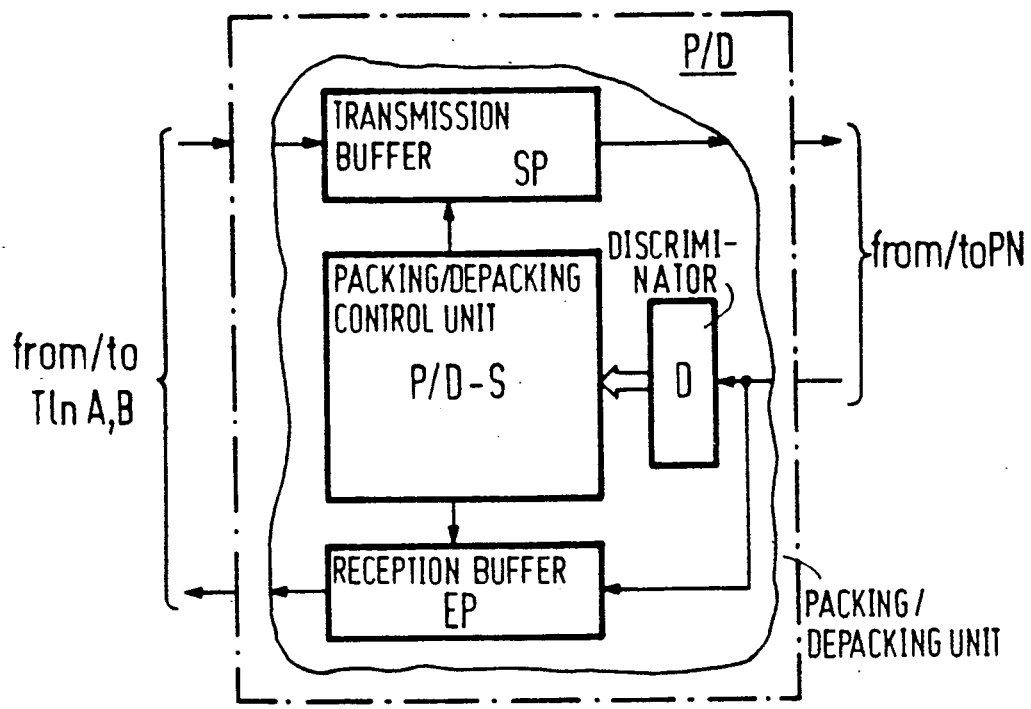
FIG. 3 shows a block diagram of a packing/depacking unit of the present invention.

FIG. 3 shows schematically a packing/depacking unit P/D connected to a subscriber's set of the packet exchange. Since its design and operation have already been described, all that is described is the transmission buffer SP to form packets of a fixed length to be transmitted within the packet exchange PN, a reception buffer EP for breaking up packets received by way of the packet exchange as well as a packing/depacking control unit P/D-S. In addition to said units, a discriminator D is also provided that monitors the occurrence of a control signal transmitted from an interworking unit during trunking. As already mentioned, transmission of a control signal can take place, e.g., in a packet that is to be transmitted following trunking in the direction of the subscriber's set selected for the connection.

On recognition of a control signal the discriminator D delivers an adjustment signal to the packing/depacking control unit P/D-S, optionally after recoding. With the help of this adjustment signal the transmission buffer SP and the reception buffer EP are adjusted from the packing/depacking control unit. For this purpose, counting circuits that are usually present in a packing/depacking unit and serve the purpose of controlling said buffers are preset so the transmission buffer SP inserts a number of speech signals corresponding to the adjusted degree of packet filling into a speech signal packet to be transmitted, or the reception buffer EP performs a breakup of received speech signal packets in accordance with the adjusted degree of packet filling.

In the basic setting said counting circuits can be preset so that speech signal packets are completely filled with speech signals or speech signal packets are completely broken up. Only in response to the occurrence of a control signal is the presetting modified in order to set the transmission buffer SP and the reception buffer EP at a reduced degree of packet filling in accordance with the received control signal.

Figure 4:
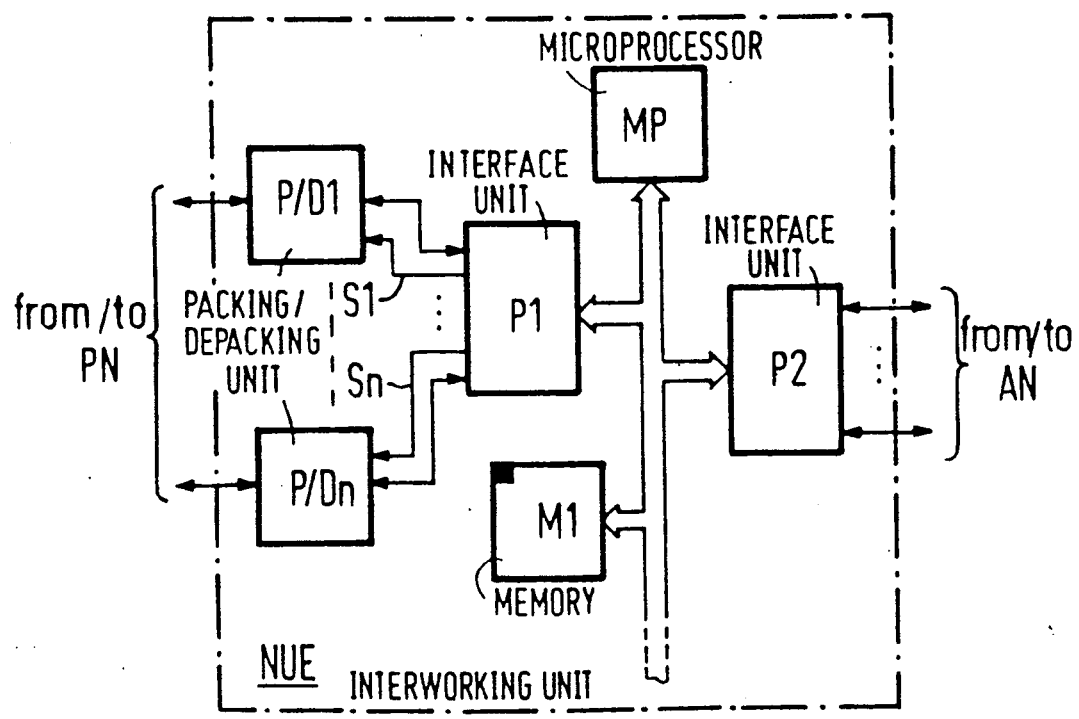
FIG. 4 shows a block diagram of a network transfer system according to the present invention.

FIG. 4 shows a block schematic of an interworking unit NUE, which, has a microprocessor circuit with a microprocessor MP to whose bus system a memory M and interface units P1 and P2 are connected. The memory consists of read-write memories and program memories in a known way. A trunk group that is connected to a telephone switching network can be connected to interface unit P2. On the other hand, the interface unit P1 is connected to a number of packing/depacking units P/D1 to P/Dn. These serve the purpose of connecting the respective interworking units to a packet switching network. In addition, a control line also leads to these packing/depacking units from the interface P1. These control lines are labeled as S1 to Sn in FIG. 4.

Packing/depacking units P/D1 to P/Dn also have essentially a design like that described above with regard to FIG. 3. However, there is a difference inasmuch that no discriminator is provided here but instead the respective packing/depacking control unit is connected to one of the aforementioned control lines S1 to Sn by means of which the degree of packet filling is set.

All signal and procedure conversions needed for a network transition are performed in a known way by the interworking unit diagrammed in FIG. 4. In addition, microprocessor MP checks the communications signals sent to it by way of the interfaces P1 and P2 for the occurrence of signals that initiate trunking. On occurrence of such signals, an above-mentioned control signal is sent to the respective packing/depacking unit for the given connection for setting it by way of the respective control line (S1, . . . , Sn). The microprocessor also inserts this control signal into a signaling packet which, as mentioned above, is to be transmitted to the other packing/depacking units participating in the connection to be established.

The process according to the present invention has been described herein by means of two examples of broad-band communications networks which include a braod-band packet switching network and a telephone switchig network for connection of analog subscriber's sets. Use of this invention is not limited to such communications networks, however, but instead can be used in general in broad-band communications networks which contain at least one broad-band packet switching network and a telephone switching network and where the lag times are to be reduced for the purpose of speech signal transmission.

I claim:

1. A method for transmission of speech signals following dial connections between subscriber sets of broad-band-communications network which includes at least one packet switching network with at least one packet exchange for transmission of communications signals of different services in packets of a fixed length and at least one telephone switching network with at least one telephone exchange for connection of analog telephone subscriber's sets, whereby at least one interworking unit is provided for a network interworking between said packet switching network and said telephone switching network, said interworking unit being connected by a trunk group with a plurality of individual lines to said telephone switching network and by at least one first packing/depacking unit connected to a transmission line of said packet switching network and whereby subscriber sets of said packet switching network are each connected to one of second packing/depacking units comprising the steps of:

delivering a control signal by said interworking unit upon the occurrence of a request signal calling for a dial connection on one of the individual lines of said trunk group or on said transmission line; and receiving said control signal by said first packing/depacking unit and by one of the second packing/depacking units involved in the dial connection to be established by means of which control signal said first packing/depacking unit and said one of the second packing/depacking units are controlled following establishing of the dial connection such that after establishing of the dial connection the packets of a fixed length provided for transmission of speech signals are packed and depacked in accordance with a reduced degree of packet filling.

2. A method according to claim 1, comprising the further steps of:

sending said control signal directly from the respective interworking unit to said first packing/depacking unit; and inserting said control signal into a signaling packet to be transmitted following establishing of said dial connection to said one of the second packing/depacking units.

3. A method according to claim 1 wherein in a basic state of the second packing/depacking units the full packet capacity is utilized for transmission of speech signals, and only on the occurrence of said request signal in the respective interworking unit said control signal being sent from said interworking unit to one of the second packing/depacking units involved in the dial connection to be established to reduce the degree of packet filling.

4. A method according to claim 3 wherein in a broad-band communications network with a plurality of interworking units in different transmission directions between the packet switching network and the telephone switching network or a plurality of telephone switching networks corresponding thereto the degree of packet filling is adjusted individually by each of the interworking units by delivery a corresponding control signal depending on the direction of transmission.

5. A method according to claim 1 for a braod-band communications network in which the packet switching network is inserted as a transit switching network via interworking units corresponding to said interworking unit between said telephone switching network and another telephone switching network, further comprising the step of:

delivering said control signal only through the interworking units included in the dial connection which receives said request signal in the form of a call packet from the packet switching network.

6. A circuit comprising:

a monitoring unit provided in an interworking unit to monitor signals sent to the interworking unit via packet switching network or telephone switching network to determine the occurrence of a request signal calling for a dial connection; said monitoring unit being adapted for sending a control signal over a separate control line to a first packing/depacking unit on the occurrence of said request signal, said first packing/depacking unit being associated with the interworking unit such that the first packing/depacking unit cable set, and whereby said monitoring unit inserts said control signal into a signaling packet to be transmitted following establishing of a dial connection to the packet switching network;

a discriminator in second packing/depacking units connected to subscriber sets of the packet switching network for recognition of said control signal transmitted in said signaling packet, to provide a corresponding adjustment signal for adjusting one of said second packing/depacking units involved in dial connection to be established on recognition of said control signal.

* * * * *